(12) United States Patent
Woodell et al.

(10) Patent No.: US 8,203,480 B1
(45) Date of Patent: Jun. 19, 2012

(54) PREDICTIVE AND ADAPTIVE WEATHER RADAR DETECTION SYSTEM AND METHOD

(75) Inventors: Daniel L. Woodell, Cedar Rapids, IA (US); Roy E. Robertson, Marion, IA (US); Peter A. Olander, Marion, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 319 days.

(21) Appl. No.: 12/405,091

(22) Filed: Mar. 16, 2009

Related U.S. Application Data (63) Continuation-in-part of application No. 11/402,434, filed on Apr. 12, 2006, now Pat. No. 7,486,219, which is a continuation-in-part of application No. 11/527,878, filed on Sep. 27, 2006, now Pat. No. 7,515,088, and a continuation-in-part of application No. 11/515,642, filed on Sep. 5, 2006, now Pat. No. 7,808,422, which is a continuation-in-part of application No. 11/256,845, filed on Oct. 24, 2005, now Pat. No. 7,598,902, which is a continuation of application No. 10/631,253, filed on Jul. 31, 2003, now Pat. No. 7,129,885.

(51) Int. Cl.
*G01S 13/95* (2006.01)
*G01S 7/292* (2006.01)
*G01S 13/00* (2006.01)
*G01S 7/00* (2006.01)

(52) U.S. Cl. ......... 342/26 B; 342/26 R; 342/89; 342/91; 342/159; 342/175; 342/176; 342/179; 342/195

(58) Field of Classification Search ....... 342/26 R–26 D, 342/159–164, 175, 192–197, 82, 89–103, 342/176, 179; 701/1, 3, 200, 207, 213
See application file for complete search history.

(56) References Cited

U.S. PATENT DOCUMENTS
3,943,511 A    3/1976   Evans et al.
(Continued)

FOREIGN PATENT DOCUMENTS
EP    1 329 738 B1    10/2004
(Continued)

OTHER PUBLICATIONS
T. Bovith et al., "Detecting Weather Radar Clutter by Information Fusion With Satellite Images and Numerical Weather Prediction Model Output"; printed in the journal, "Geoscience and Remote Sensing Symposium, 2006"; Issue Date is Jul. 31, 2006 through Aug. 4, 2006; Denver, Colorado, USA; Print ISBN: 0-7803-9510-7; pp. 515-518.*

(Continued)

*Primary Examiner* — Bernarr Gregory
(74) *Attorney, Agent, or Firm* — Donna P. Suchy; Daniel M. Barbieri (57) ABSTRACT

A method of detecting weather on an aircraft uses a weather radar system. The method adapts the weather radar system in accordance with a time-of-year parameter, a time-of-day parameter, and/or a location parameter to remove ground clutter reflectivity. The method includes determining the particular parameter and automatically adjusting the weather radar system to display the weather in response to the parameter. The system can be implemented in hardware and/or software and can advantageously predict and identify weather and/or weather hazards more precisely.

22 Claims, 6 Drawing Sheets

U.S. PATENT DOCUMENTS

| | | |
|---|---|---|
| 3,964,064 A | 6/1976 | Brandao et al. |
| 3,968,490 A | 7/1976 | Gostin |
| 4,283,715 A | 8/1981 | Choisnet |
| 4,283,725 A | 8/1981 | Chisholm |
| 4,318,100 A | 3/1982 | Shimizu |
| 4,430,654 A | 2/1984 | Küpfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,613,938 A | 9/1986 | Hansen et al. |
| 4,658,255 A | 4/1987 | Nakamura et al. |
| 4,684,950 A | 8/1987 | Long |
| 4,742,353 A | 5/1988 | D'Addio et al. |
| 4,835,536 A | 5/1989 | Piesinger et al. |
| 4,928,131 A | 5/1990 | Onozawa |
| 5,049,886 A | 9/1991 | Seitz et al. |
| 5,077,558 A | 12/1991 | Kuntman |
| 5,198,819 A | 3/1993 | Susnjara |
| 5,296,865 A | 3/1994 | Lewis |
| 5,311,183 A | 5/1994 | Mathews et al. |
| 5,311,184 A | 5/1994 | Kuntman |
| 5,485,157 A | 1/1996 | Long |
| 5,945,926 A | 8/1999 | Ammar et al. |
| 6,081,220 A | 6/2000 | Fujisaka et al. |
| 6,154,169 A | 11/2000 | Kuntman |
| 6,177,873 B1 | 1/2001 | Cragun |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,297,772 B1 | 10/2001 | Lewis |
| 6,388,607 B1 | 5/2002 | Woodell |
| 6,388,608 B1 | 5/2002 | Woodell et al. |
| 6,424,288 B1 | 7/2002 | Woodell |
| 6,456,226 B1 | 9/2002 | Zheng et al. |
| 6,512,476 B1 | 1/2003 | Woodell |
| 6,518,914 B1 | 2/2003 | Peterson et al. |
| 6,549,161 B1 | 4/2003 | Woodell |
| 6,577,947 B1 | 6/2003 | Kronfeld et al. |
| 6,597,305 B2 | 7/2003 | Szeto et al. |
| 6,603,425 B1 | 8/2003 | Woodell |
| 6,614,382 B1 | 9/2003 | Cannaday, Jr. et al. |
| 6,650,275 B1 | 11/2003 | Kelly et al. |
| 6,667,710 B2 | 12/2003 | Cornell et al. |
| 6,670,908 B2 | 12/2003 | Wilson et al. |
| 6,677,886 B1 | 1/2004 | Lok |
| 6,690,317 B2 | 2/2004 | Szeto et al. |
| 6,741,203 B1 | 5/2004 | Woodell |
| 6,771,207 B1 * | 8/2004 | Lang .......................... 342/159 |
| 6,850,185 B1 | 2/2005 | Woodell |
| 6,879,280 B1 | 4/2005 | Bull et al. |
| 6,882,302 B1 | 4/2005 | Woodell et al. |
| 7,030,805 B2 | 4/2006 | Ormesher et al. |
| 7,042,387 B2 | 5/2006 | Ridenour et al. |
| 7,129,885 B1 | 10/2006 | Woodell et al. |
| 7,259,714 B1 * | 8/2007 | Cataldo ...................... 342/159 |
| 7,486,219 B1 | 2/2009 | Woodell et al. |
| 7,515,087 B1 | 4/2009 | Woodell et al. |
| 7,515,088 B1 | 4/2009 | Woodell et al. |
| 2003/0016156 A1 | 1/2003 | Szeto et al. |

FOREIGN PATENT DOCUMENTS

| | | |
|---|---|---|
| FR | 2658617 A1 | 8/1991 |
| WO | WO 98/07047 A1 | 2/1998 |

OTHER PUBLICATIONS

U.S. Appl. No. 11/256,845, filed Oct. 25, 2005, Woodell et al.

Dupree et al., FAA Tactical Weather Forecasting in the United States National Airspace, Proceedings from the World Weather Research Symposium on Nowcasting and Very Short Term Forecasts, Toulouse, France, 2005, 29 pages.

Klingle-Wilson et al., Description of Corridor Integrated Weather System (CIWS) Weather Products, Aug. 2005, Prepared for the Federal Aviation Administration by MIT—Lincoln Laboratory, 120 pages.

Pessi, et al., On the Relationship Between Lightning and Convective Rainfall Over the Central Pacific Ocean, Feb. 28, 2004, 9 pages.

Zipser et al., The Vertical Profile of Radar Reflectivity and Convective Cells: A Strong Indicator of Storm Intensity and Lightning Probability?, American Meteorological Society, Aug. 1994, pp. 1751-1759.

Corridor Integrated Weather System (CIWS), http://www.ll.mit.edu/mission/aviation/faawxsystems/ciws.html believed to be available by Jul. 31, 2002, 3 pages.

* cited by examiner

PREDICTIVE AND ADAPTIVE WEATHER RADAR DETECTION SYSTEM AND METHOD

CROSS-REFERENCE TO RELATED PATENT APPLICATIONS

The present application is a continuation-in-part of and claims priority benefit from U.S. application Ser. No. 11/402,434 filed on Apr. 12, 2006, now U.S. Pat. No. 7,486,219. The present application is also a continuation-in-part of and claims priority benefit from U.S. application Ser. No. 11/527,878 filed on Sep. 27, 2006, now U.S. Pat. No. 7,515,088. Further, the present application is a continuation-in-part of and claims priority benefit from U.S. patent application Ser. No. 11/515,642 filed Sep. 5, 2006 now U.S. Pat. No. 7,808,422, which is a continuation-in-part of U.S. patent application Ser. No. 11/256,845 filed Oct. 24, 2005 now U.S. Pat. No. 7,598,902, which is a continuation of U.S. patent application Ser. No. 10/631,253 filed Jul. 31, 2003 now U.S. Pat. No. 7,129,885. Each of U.S. application Ser. No. 11/402,434, now U.S. Pat. No. 7,486,219 U.S. application Ser. No. 11/527,878, now U.S. Pat. No. 7,515,088 U.S. patent application Ser. No. 11/515,642, now U.S. Pat. No. 7,808,422 U.S. patent application Ser. No. 11/256,845, now U.S. Pat. No. 7,598,902 and U.S. patent application Ser. No. 10/631,253, now U.S. Pat. No. 7,129,885 are hereby incorporated by reference in their entireties.

BACKGROUND

Conventionally, pilots use weather radar to detect and avoid hazardous weather. Conventional radar systems may produce the desired results only in a limited environment. Typically, airborne threshold systems use thresholds for wet precipitation derived from ground-based weather radar thresholds which were generated from convective weather detections. Such thresholds have been set in accordance with reflectivity data which is applicable to typical convective weather systems. It has been observed that for airborne applications ground clutter causes differences in reflectivity which may cause inaccurate weather indications. A feature of conventional radar systems is the ability to suppress display of returns from the ground in favor of returns from weather. These ground clutter suppression systems may have limited effectiveness with certain local geographical conditions, such as in the presence of cities, especially cities near bodies of water, and with tall objects, such as towers beyond the horizon. Such ground clutter may erroneously be presented as a weather target. Conventionally, weather radar ground clutter suppression systems may rely on different return signals resulting from radar beam sweeps occurring at different beam elevations. Even so, many geographical phenomena may not be suppressed using present ground clutter suppression systems.

Conventionally, radar thresholds map radar return strength to a display with color representing rain rate or alternatively a weather threat assessment level. The threat level has been previously described as primarily a function of radar reflectivity and a weaker function of temperature, altitude, and latitude. However, because of various geographical phenomena, the conventional mapping, while useful, does not completely allow successful operation of aircraft in difficult geographic situations. The higher reflectivity of these geographic phenomena produces erroneous detection of significant convective weather systems during flight. Further, because of the ability of aircraft flying over such geographical phenomena to circumnavigate storm systems, when believed to be present, it would therefore be desirable to provide an airborne radar system which has the ability to more accurately detect and report the existence and/or characteristics of storms when operating in various geographically diverse environments.

It may be possible for a pilot operating a radar manually to be able to compensate for the differences in geographical phenomena as each pilot becomes familiar with the environment. However, knowledge by the pilot must be acquired, and further, an increase in pilot workload is also necessitated. Therefore, there is a need for an automated system of adjusting radar thresholds based on the presence of a variety of geographical phenomena.

In addition, ground clutter reflectivity can vary by time of day and time of year, in various geographical regions. For example, dew forming on grass increases ground reflectivity. Ground reflectivity also may vary depending on whether forests are leaf covered or bare or whether fields are filled or fully vegetated. Similarly, snow covered landscapes reflect differently than green grasslands. Thus, it may be desirable to identify ground clutter in accordance with temporal information.

In addition, weather characteristics can change according to seasonal and time-of-day variations. For example, certain radar reflectivities occurring during the monsoon season may indicate hazardous weather while those same radar reflectivities would indicate non-hazardous weather during another season. Similarly, weather radar returns at a certain time-of-day are more likely to indicate the presence of hazardous weather (e.g., afternoon) while those same returns are less likely to indicate the presence of a hazard at another time-of-day (e.g., early morning). Accordingly, it would be desirable to provide a radar system which can compensate radar detection in accordance with both temporal and spatial information.

Accordingly, there is a need to adjust weather radar detection and ground clutter suppression schemes based upon a specific geographic location, time-of-day, and/or season (time-of-year). There is further a need to adjust weather radar systems by adjusting display thresholds, tilt angle, and/or system gain. Yet further, there is a need for a weather radar system that automatically adjusts to location time-of-day, and/or time-of-year. Yet further still, there is a need to adjust weather radar systems by adjusting thresholds and parameters based on known ground clutter locations.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a method of detecting weather on an aircraft using a weather radar system. The method includes determining a location of reflective radar targets, accessing a database having information relating to ground clutter of the reflective radar targets, retrieving weather radar information associated with the location and automatically adjusting the weather radar return thresholds in response to the information.

Another exemplary embodiment relates to a method of adapting an aircraft weather radar system. The method includes determining at least one of a time-of-year parameter, a time-of-day parameter, or a location parameter. The method also includes automatically adjusting the weather radar system radar return display thresholds to display weather in response to at least one of the time-of-year parameter, time-of-day parameter, or location parameter.

Still another exemplary embodiment relates to an airborne weather radar system carried on an aircraft. The airborne weather radar system includes a radar antenna system and a processing means for adjusting display thresholds of the weather radar system. The processing means adjusts performance of the weather radar system based on a location of known ground clutter targets.

Yet still another exemplary embodiment relates to a method of creating a weather radar display threshold database. The method comprises receiving, by a ground-based weather radar system, weather radar returns for a location. The method also comprises receiving by an airborne based weather radar system weather radar returns over the location. Further, the method comprises determining a display threshold for the airborne based weather radar system which provides a substantial match of the ground-based weather radar returns and the airborne based weather radar returns.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional aircraft systems, radar systems attempt to detect weather which may be a threat to the aircraft or passengers. However, in environments in which ground clutter or other ground reflectivity effects are pronounced, the radar systems may misidentify ground as threatening weather. As a result, air carriers attempt to circumvent weather systems which are nonexistent and thereby waste precious fuel and time.

Radar ground clutter suppression is hampered by local geographical phenomena. For example, cities near bodies of water and tall objects such as radio towers beyond the horizon sometimes violate the assumptions made during the design of general ground clutter suppression algorithms. The result is that ground clutter leaks through the suppression algorithms and is erroneously presented to the pilot as a weather target.

Conventional radar ground clutter suppression algorithms rely on the vertical gradient of the return signals resulting from multiple radar sweeps occurring at different beam elevations. The ground clutter suppression algorithms and beam tilt algorithms are designed to reject clutter under a wide variety of conditions. Unfortunately, some geographic phenomena may defeat the generally optimized algorithm, resulting in ground clutter being presented to the pilot as weather. This issue has been observed in many conventional systems.

The trade-off which normally occurs during design of ground clutter suppression algorithms is between ground clutter suppression and weather detection. Further increase in the radar's ability to provide accurate ground clutter suppression will result in an overall decrease in the radar's ability to perform its primary function of weather detection. Much of the observed ground clutter leakage is localized and is tied to understood phenomena. For instance, ground objects with very high reflectivity located near relatively low reflective bodies of water may defeat the conventional ground clutter suppression algorithms. The highly reflective city of Chicago located on the shore of Lake Michigan is a prime example. A general modification of the ground clutter suppression algorithm to eliminate ground clutter leakage from the Chicago point target would unacceptably decrease the radar's ability to detect weather across the entire radar display area.

Localized threshold optimization methods may be used to improve weather radar ground clutter suppression algorithms. The weather radar may contain a local terrain database which is currently used to determine optimal tilt angle. This database can also be tagged with localized clutter suppression/weather detection threshold information which can be processed to minimize the probability of ground clutter leakage over specific geographical areas. Even though the threshold over such "problem" areas can be locally tuned to favor ground clutter suppression, weather detection over such areas will actually be improved since it is impossible to accurately display weather phenomena over areas where ground clutter is actively leaking onto the display.

The position of the aircraft relative to the "problem" geographical feature can be used to qualify the use of the threshold information. The tops of tall, reflective objects such as weather towers poke above the horizon and result in ground clutter leakage. These objects are only a problem when they lie at a specific distance from the aircraft. Specific phenomena such as weather towers can be tagged as "horizon-only" problems and local optimization of clutter thresholds can occur based on their position relative to the local horizon.

Previous approaches to ground clutter suppression involved various algorithms including, but not limited to active editing of return data. Such editing is done by accessing a terrain database and identifying areas of typically higher reflectivity and removing any radar returns from that area.

The key techniques, methodologies, and systems provided herein are an improvement over editing of radar returns.

Figure 1:
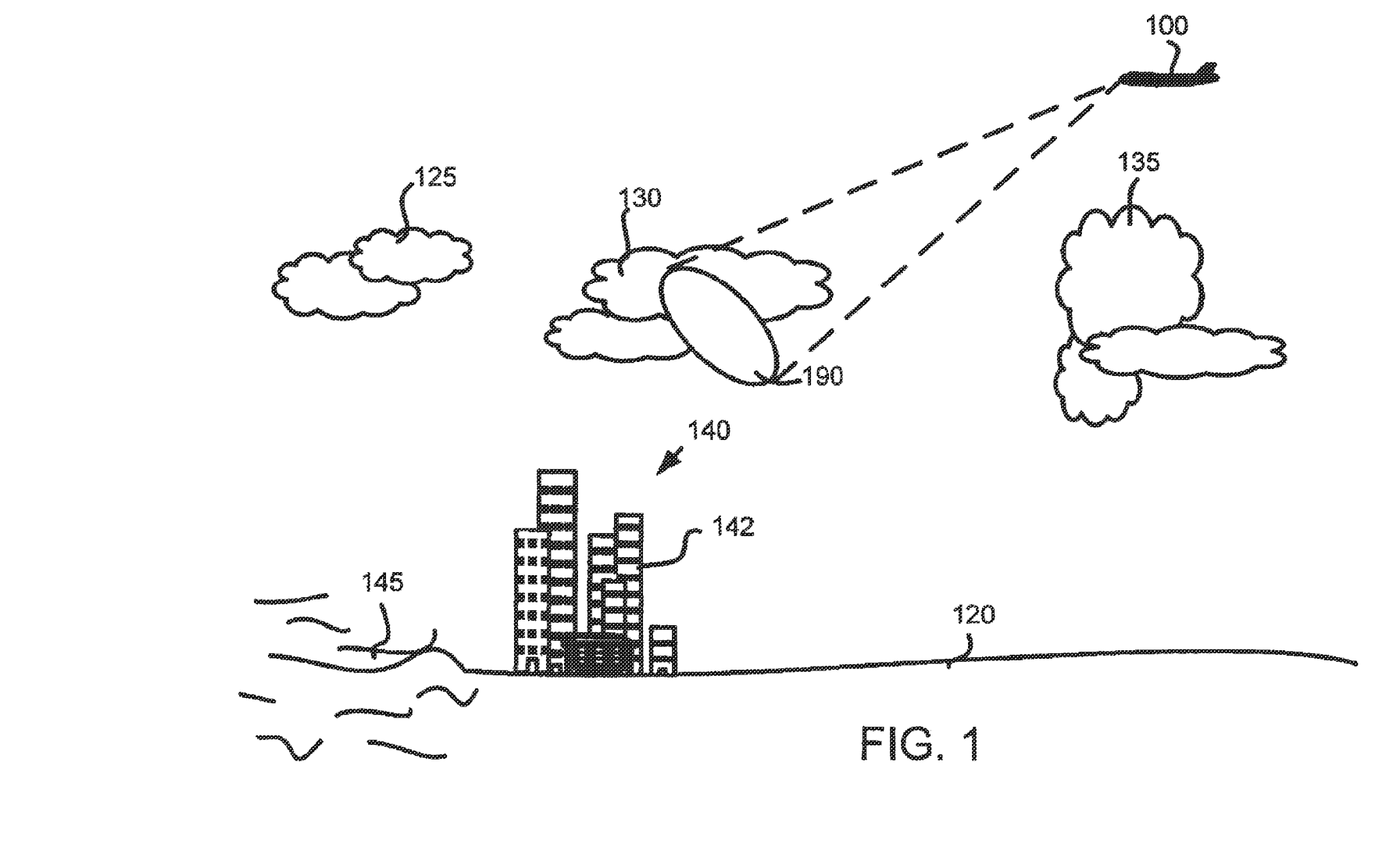
FIG. 1 is an exemplary diagram of an airplane having a weather radar system and flying in the atmosphere.

Referring to FIG. 1, an aircraft 100 is depicted having a radar on-board capable of casting a radar beam 190 and receiving reflective energy from weather systems 125, 130, 135, and the like. Weather systems 125, 130, and 135 may be representative of any variety of weather systems. Convective weather system 130 may be over a city 140 having a plurality of buildings 142. City, 140 maybe on the shores of a major body of water 145.

Figure 2:
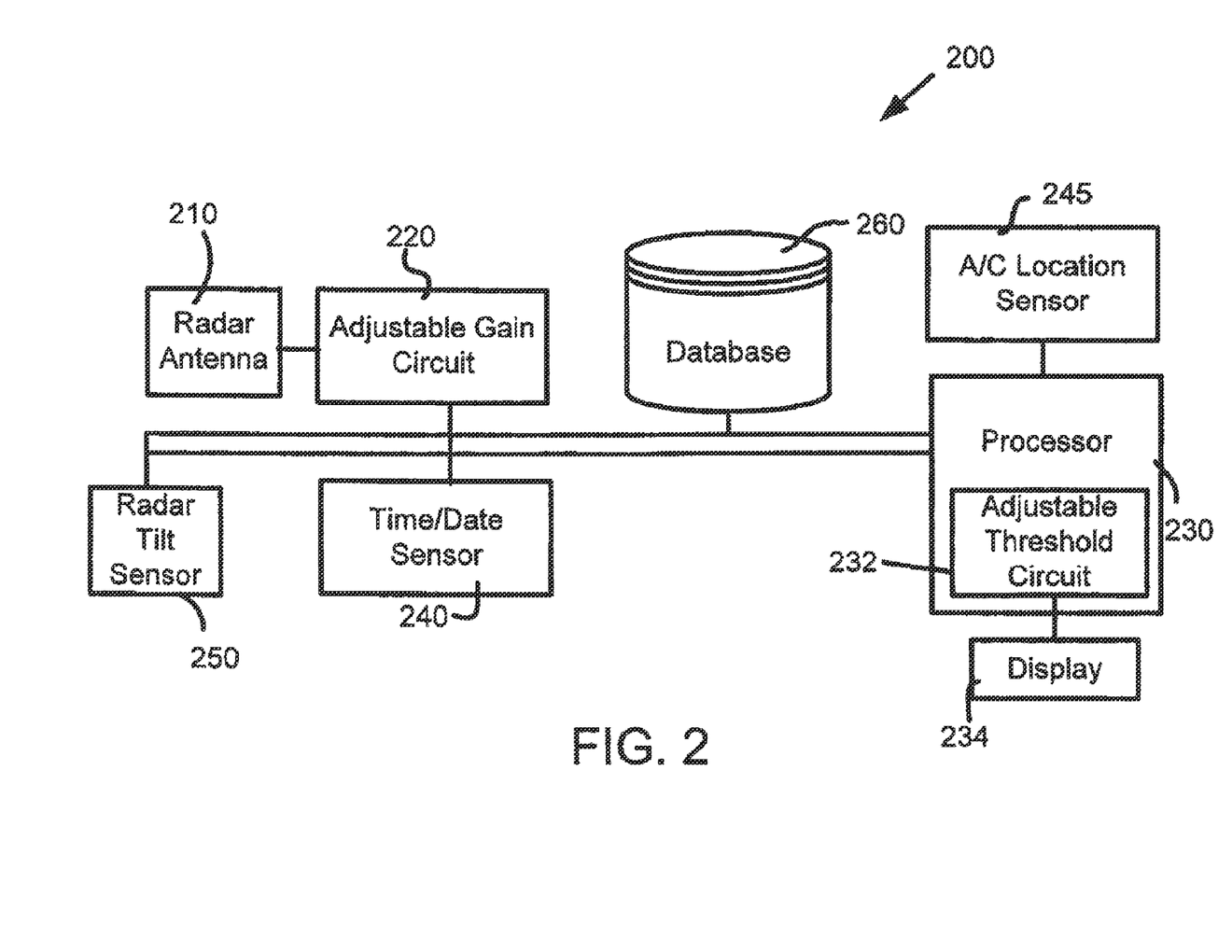
FIG. 2 is an exemplary block diagram of a radar system having an adjustable threshold circuit.

Referring now to FIG. 2, a radar system 200 includes a radar antenna 210 for sending and receiving radar signals. System 200 also includes an adjustable gain circuit 220 that is configured to change the gain of the radar signal provided to or received from radar antenna 210. Processing device 230 receives time and date data from time/date sensor 240 and radar tilt sensor 250, among other systems and sensors. Further, processing device 230 receives location data from an aircraft location sensor 245, such as but not limited to a GPS receiver. In an exemplary embodiment, processing device 230 also accesses a database 260 which contains information relating to known ground clutter locations based on the location of the aircraft. Processing device 230 may also be configured with instructions which calculate and/or determine an appropriate adjustable threshold command via a control law which is based on the location of the aircraft, the known ground clutter location, the time-of-day, the time-of-year, etc. The adjustable threshold command is to be communicated to an adjustable threshold circuit 232 based on data supplied to processing circuit 230 such as but not limited to the locations of the aircraft, locations of known ground clutter, time-of-day, time-of-year, temperature inputs, and the radar beam direction. As shown, adjustable threshold circuit 232 is running on processor 230, however adjustable threshold circuit is not limited to the depicted structure but may be running on a different processor or a dedicated circuit or processor. Further, other information such as latitude, longitude, maritime, or continental, etc. may also be used to make the gain adjustment. Database 260 may be used to describe whether a specific location (i.e., latitude, longitude) is near a known ground clutter target. The database may be generated from a table of altitudes versus latitude/longitude.

A threshold control law used in adjustable threshold circuit 232 may be based on any of a number of factors, including but not limited to the location of the aircraft, the location of ground clutter, the location of bodies of water, the time-of-day, the time-of-year, etc. The thresholds may be adjusted according to these characteristics using adjustable threshold circuit 232, and thereby display, on display 234, the appropriate weather-hazard alert or condition. Other types of alerts may also be used and be based on the adjustable thresholds, including but not limited to visual and aural warnings. In an exemplary embodiment, location, time, date, etc. may be used to predict ground reflectivity so ground clutter can be suppressed. Also, in an exemplary embodiment, location, date, time, etc. may be used to adjust thresholds to more accurately depict weather hazards.

In accordance with an exemplary embodiment, any type of weather radar that operates in a range of environments may be used. This includes, but is not limited to simple auto-tilt radars, manual radars, as well as fully automatic systems including but not limited to the WXR-2100 multiscan radar available from Rockwell Collins of Cedar Rapids, Iowa.

In an alternative embodiment, system 200 may be used to control antenna tilt, gain control on the receive side, gain control on the transmit side, as well as thresholds.

The database may be used to bias the threshold process, the gain control process, or antenna tilt. Antenna beams which impinge on known ground clutter have their effective gain reduced during sampled ranges that have that interaction. This allows known ground clutter to not be displayed to the pilot and allows increased weather detection characteristics in areas of typically high reflectivity. The gain reduction system differs from an editing system in that boundary values may be softened to reduce the effects of identification mistakes and still allow weather detection in the area influenced by land, island, or mountain targets.

In a similar manner, the thresholds used in multibeam clutter rejection processes may be modified by using the database to improve weather detection margins and improve clutter removal robustness. This may allow lower antenna beam angle to interrogate weather while providing clutter rejection for precipitous terrain.

Figure 3:
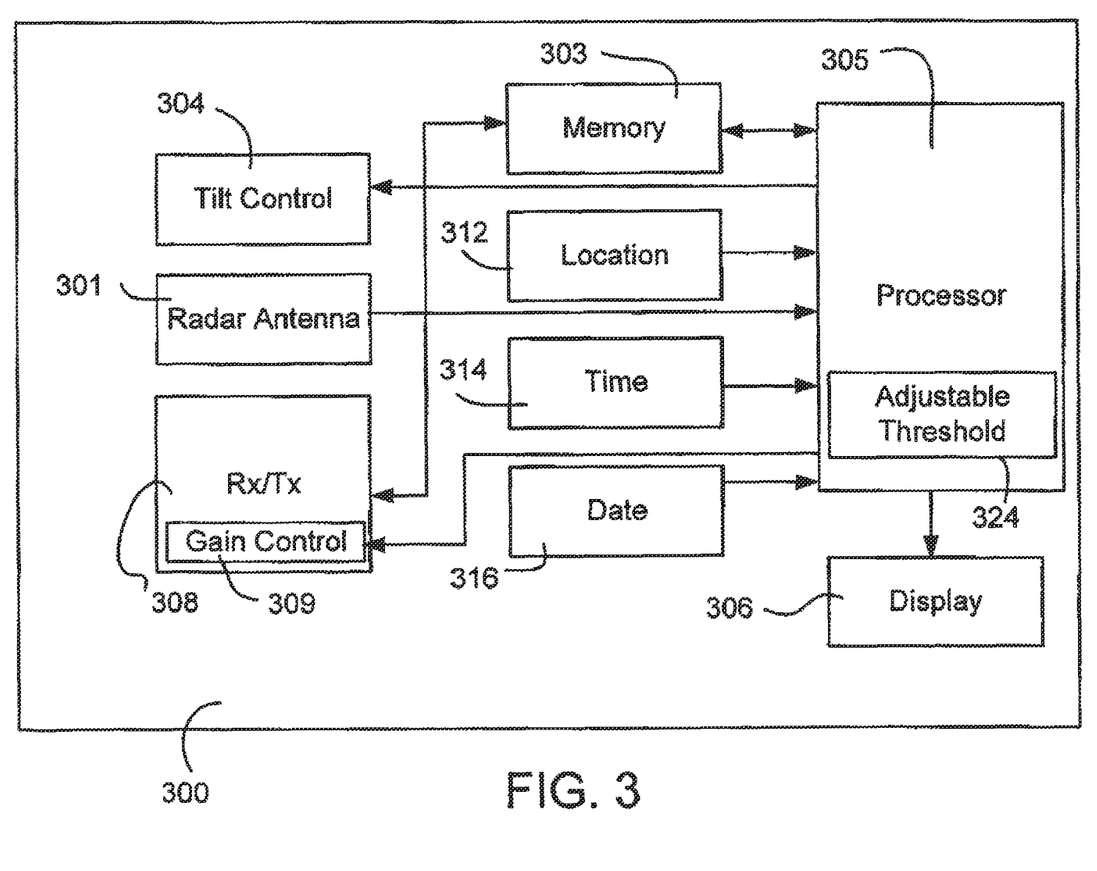
FIG. 3 is another exemplary block diagram of an airborne weather radar system capable of adjusting to time-of-day, season, and/or location.

With reference to FIG. 3, weather radar system 300 is similar to system 200 described above. System 300 may utilize any type of base hardware including the hardware associated with conventional weather radar systems manufactured by Rockwell Collins, Inc. and Honeywell International. System 300 is advantageously configured to automatically adjust to a particular location parameter, time-of-day parameter, and/or season parameter.

The location parameter can provide a precise latitude and longitude, a general area, a distance along a flight plan or other type of location indicator. The location parameter can be provided by any type of location sensor including but not limited to a GPS system. The location parameter can also be provided from an off-airplane source or be derived from flight plans and time-of-flight parameters.

System 300 preferably includes a tilt control circuit 304, a radar antenna 301, a receive transmit circuit 308, a memory 303, a location circuit 312, a clock circuit 314, a date circuit 316, a display 306, and a processor 305. Processor 305 may include a display threshold adjustment circuit 324. Circuit 324 may operate in accordance with the description provided above. Gain control circuit 309 can operate on the receive end or the transmit end. Preferably, gain control circuit 309 operates on the transmit end and is controlled by a signal from processor 305 or alternatively operates in processor 305.

Location circuit 312 provides a location parameter to processor 305. In one embodiment, the location parameter can indicate a specific geographic area in which known ground clutter targets exist by comparing the present location of the aircraft with locations of known ground clutter stored in memory 303 or a database, etc. Some specific geographic regions that have particular ground clutter characteristics include cities which are often highly reflective. In particular, large cities by large bodies of water, mountains, buildings on the horizon, and other similar features may be very highly reflective.

In an alternative embodiment, the location parameter can indicate a specific region having a predetermined target area. For example, the location parameter can be any area, but typical examples would be in the range of a several square mile region. The size and/or borders of regions can change as a function of location, time-of-day, and/or season.

Clock circuit 314 provides an indication of time-of-day to processor 305. Date circuit 316 provides a time-of-year indication to processor 305. Although shown as coupled directly to processor 305, circuits 312, 314, and 316 can be incorporated within processor 305 and can even be provided wholly or at least partially as a software sub-routine. In addition, circuits 312, 314, 316 can communicate with processor 305 through memory 303. Processor 305 does not need to communicate through memory 303 and can communicate directly with receive/transmit circuit 308.

Processor 305 can provide control signals to tilt control circuit 304 and gain control circuit 309. System 300 can be adjusted through processor 305 to take into account a location parameter from circuit 312, a time-of-day parameter from circuit 314, and a time-of-year parameter from circuit 316. Processor 305 preferably automatically adjusts at least one of display threshold circuit 324, tilt control circuit 304, and gain control circuit 309. The adjustment preferably makes the sensing of weather regions and their severity more accurate and allows more accurate removal of ground clutter. Gain control circuit 309 can control the gain associated with the transmit end or the receive end of signals provided to and from antenna 301.

Antenna controlled elevations, radar gains, weather detection thresholds, and ground clutter rejection thresholds can also be a function of time-of-year and time-of-day. As an example of time-of-year adjustments, consider the changes in ground reflectivity with changes in snow cover and grass cover, seasonal changes in forest foliation and defoliation, etc. An example of time-of-day adjustment may involve the presence of dew causing increased reflectivity during early morning, etc.

Figure 4:
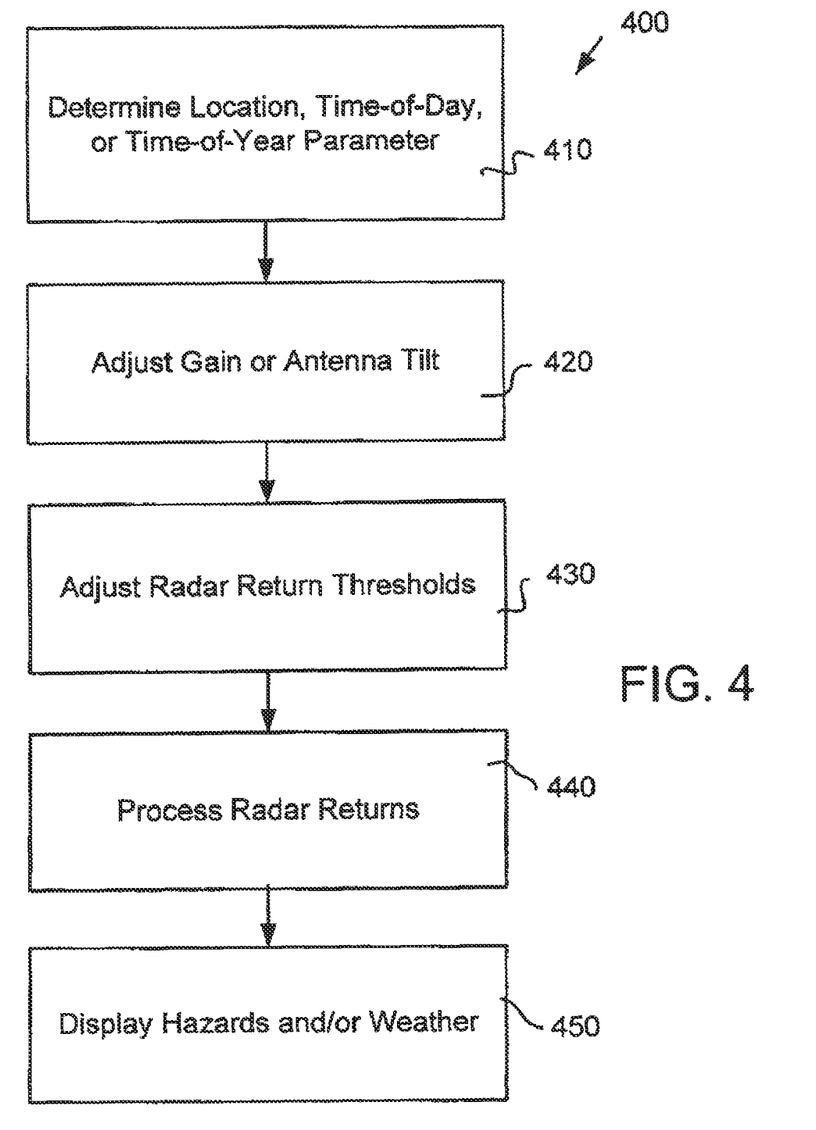
FIG. 4 is an exemplary flow diagram of the operation of the airborne weather radar system illustrated in FIG. 3 in accordance with an exemplary embodiment.

With reference to FIG. 4, a flow diagram 400 depicts the operation of circuit 300. Processor 305 preferably operates software to implement flow diagram 400. A location parameter, time-of-day parameter, and/or seasonal parameter is determined (process 410). The antenna tilt is then adjusted in accordance with the parameter or the gain is adjusted in accordance with the parameter (process 420). Radar return thresholds, display thresholds, and/or ground clutter rejection thresholds may also be adjusted based on the parameters to support the ground clutter rejection (process 430) and to optimize weather detection. Processor 305 processes radar returns (process 440). Processor 305 then provides indications of hazards and/or weather on display 306 (process 450).

Figure 5:
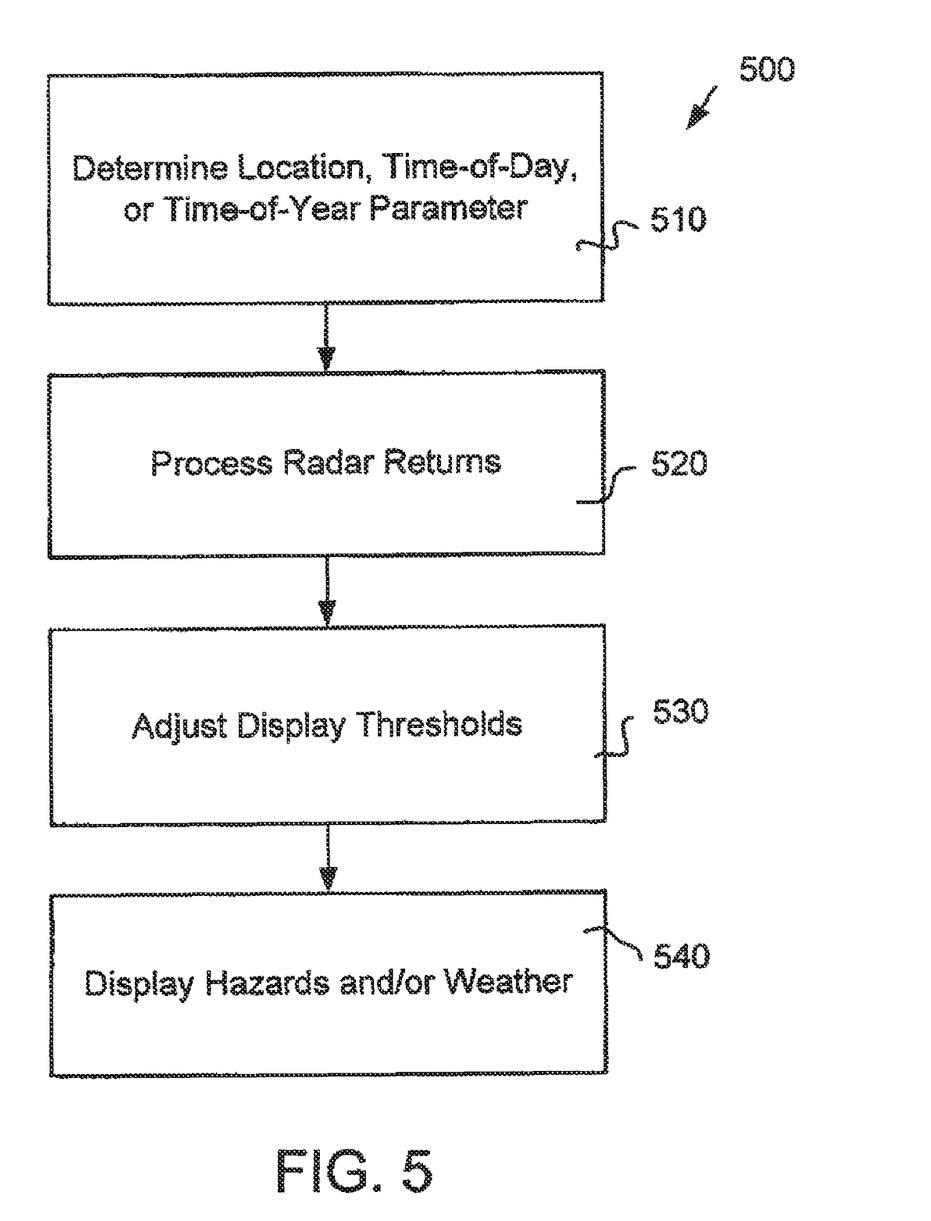
FIG. 5 is an exemplary flow diagram of the operation of the airborne weather radar system illustrated in FIG. 3 in accordance with yet another exemplary embodiment.

With reference to FIG. 5, a flow diagram 500 depicts operation of system 300 in accordance with another embodiment. Processor 305 preferably operates software to implement flow diagram 500. A location parameter, time-of-day parameter, or seasonal parameter is determined (process 510). Radar returns are processed in processor 305 (process 520). The threshold associated with the display of hazards or weather is adjusted (process 530). Indications of hazards and/or weather are then displayed on display 306 (process 540). Thresholds may be adjusted on a complete radar sample environment or on a radar resolution cell by radar resolution cell basis. In one embodiment, thresholds preferably slew smoothly from space/time region to space/time region with step changes preferably not being allowed.

Figure 6:
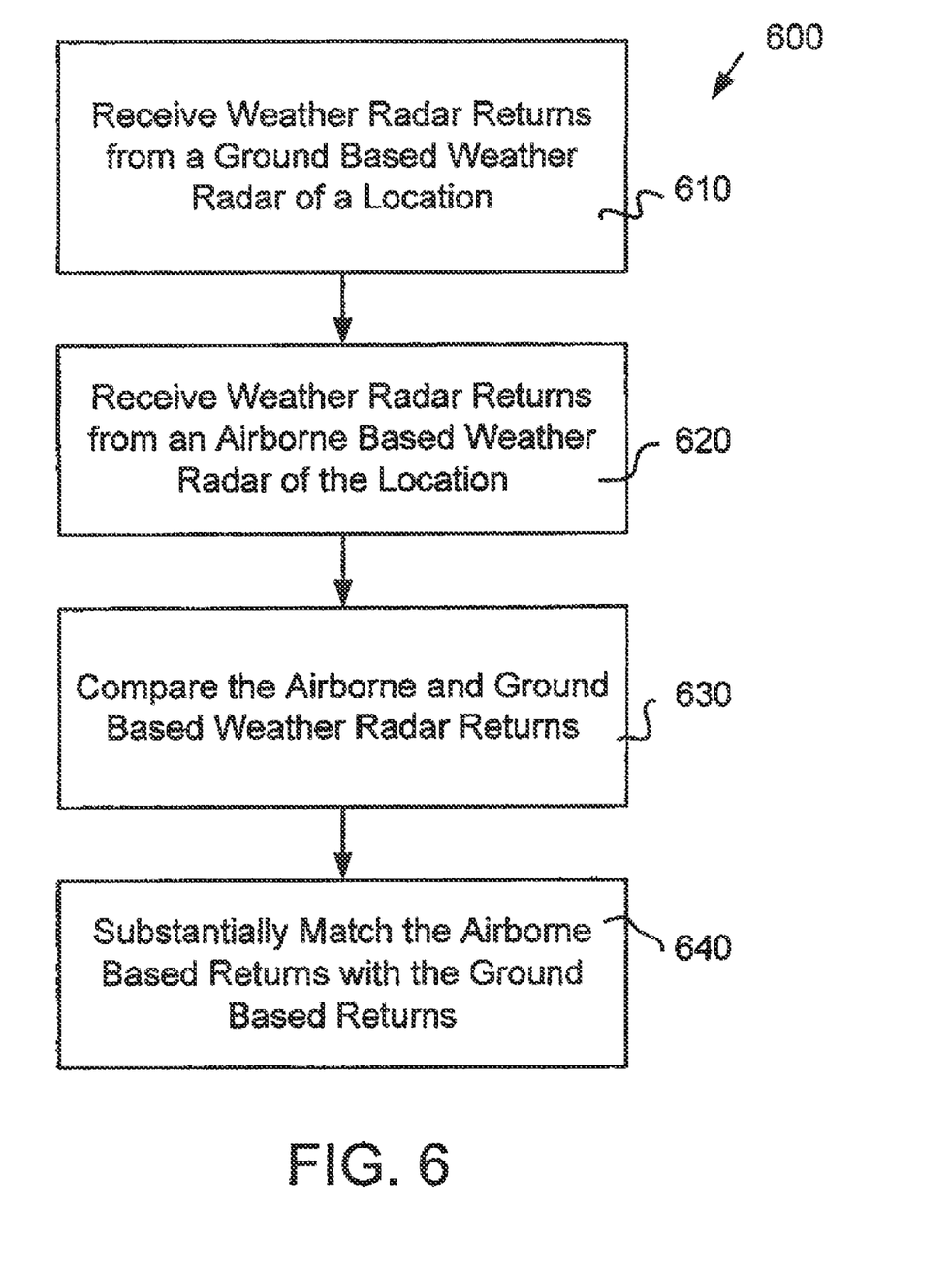
FIG. 6 is an exemplary flow diagram of an airborne weather radar system using ground based returns in accordance with still another exemplary embodiment.

Referring now to FIG. 6, a method 600 of creating a weather radar display threshold database comprises receiving weather radar returns from ground-based weather radar from a location (process 610). The method also comprises receiving weather radar returns from an airborne based weather radar over a location (process 620). Once the weather radar returns have been received, a comparison may be made of the airborne and ground based weather radar returns (process 630). Once this comparison is accomplished a substantial match of the airborne based returns and the ground-based returns may be made by providing display thresholds (process 640). In accordance with other exemplary embodiments, a plurality of learning systems may be applied in order to determine the display thresholds needed to achieve, in an optimal manner, the matching airborne based weather radar returns being displayed.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft weather radar system for detecting weather using radar returns received at an antenna of the aircraft weather radar system, comprising:
   a database configured to associate a plurality of locations with ground clutter information; and
   a processing device configured to process the radar returns and to adjust a setting for the weather radar system based on an association of a location in the database and ground clutter information relating to the location;
   wherein the processing device is further configured to determine the location by receiving global positioning system (GPS) signals related to the location of the aircraft.

2. The aircraft weather radar system of claim 1, wherein the ground clutter information comprises at least one of:
   (a) ground clutter rejection thresholds, and
   (b) ground clutter reflectivity values.

3. The aircraft weather radar system of claim 1, wherein adjusting a setting for the weather radar system comprises at least:
   applying a threshold control law to adjust a threshold for a weather radar display associated with the weather radar system.

4. The aircraft weather radar system of claim 1, wherein adjusting a setting for the weather radar system comprises at least:
   adjusting a weather radar signal gain.

5. The aircraft weather radar system of claim 1, wherein adjusting a setting for the weather radar system comprises at least:
   adjusting a tilt angle of a weather radar antenna.

6. The aircraft weather radar system of claim 1, wherein adjusting a setting for the weather radar system comprises at least:
   adjusting a ground clutter suppression threshold in order to suppress ground clutter.

7. An aircraft weather radar system for detecting weather using radar returns received at an antenna of the aircraft weather radar system, comprising:
   a database configured to associate a plurality of locations with ground clutter information; and
   a processing device configured to process the radar returns and to adjust a setting for the weather radar system based on an association of a location in the database and ground clutter information relating to the location;
   wherein the database further relates the plurality of locations and ground clutter information with at least one of a time-of-day and a time-of-year.

8. The aircraft weather radar system of claim 7, wherein adjusting a setting for the weather radar system comprises at least one of:
  (a) applying a threshold control law to adjust a threshold for a weather radar display associated with the weather radar system,
  (b) adjusting a weather radar signal gain,
  (c) adjusting a tilt angle of a weather radar antenna, and
  (d) adjusting a ground clutter suppression threshold in order to suppress ground clutter.

9. The aircraft weather radar system of claim 8, wherein the processing device is further configured to determine a ground clutter type at the location.

10. The aircraft weather radar system of claim 9, wherein the ground clutter type comprises a geographical terrain classification.

11. The aircraft weather radar system of claim 9, wherein the processing device further generates a weighting factor based on the location, the time-of-day, and the time-of-year, wherein the weighting factor is representative of the reflectivity of the ground clutter at the location.

12. An aircraft weather radar system that displays information via weather radar display electronics, the aircraft weather radar system comprising:
  a processing device configured to utilize at least one of a time-of-year parameter, a time-of-day parameter, and a location parameter to adjust a display threshold for displaying the information; wherein the processing device is configured to receive the location parameter from a global positioning system (GPS).

13. The system of claim 12, wherein the location parameter comprises information relating to known ground clutter targets.

14. An aircraft weather radar system that displays information via weather radar display electronics, the aircraft weather radar system comprising:
  a processing device configured to utilize at least one of a time-of-year parameter, a time-of-day parameter, and a location parameter to adjust a display threshold for displaying the information;
  wherein the adjusting occurs in response to the location parameter and the time-of-year parameter or the location parameter and the time-of-day parameter or the time-of-year parameter and the time-of-day parameter.

15. An aircraft weather radar system that displays information via weather radar display electronics, the aircraft weather radar system comprising:
  a processing device configured to utilize at least one of a time-of-year parameter, a time-of-day parameter, and a location parameter to adjust a display threshold for displaying the information;
  wherein the processing device is further configured to cause the aircraft weather radar system to adjust a radar beam tilt angle based on the at least one of a time-of-year parameter, a time-of-day parameter, and a location parameter.

16. An aircraft weather radar system that displays information via weather radar display electronics, the aircraft weather radar system comprising:
  a processing device configured to utilize at least one of a time-of-year parameter, a time-of-day parameter, and a location parameter to adjust a display threshold for displaying the information;
  wherein the processing device is further configured to apply a threshold control law to adjust precipitation rate associated with the information.

17. A method for detecting weather using an aircraft weather radar system, the method comprising:
  receiving electronic radar return data at the aircraft weather radar system and providing the radar return data to an electronic processing device;
  using the electronic processing device to determine a classification of the weather based on the radar return data; and
  using the electronic processing device to select a weather sensing model in response to the classification of the weather; and
  using the weather radar system to analyze the weather using the selected weather sensing model.

18. The method of claim 17, wherein determining the classification comprises at least one of:
  determining a height of the weather,
  determining a maturity level of the weather, and
  determining a phase of development of the weather.

19. The method of claim 17, wherein determining the classification is made in response to at least one of:
  reflectivity of the weather versus a vertical temperature gradient parameter of the weather, and
  reflectivity of the weather verses altitude isotherms of the weather.

20. The method of claim 17, wherein determining the classification is made in response to at least one of:
  altitude-based information,
  time-of-day based information, and
  seasonal information.

21. The method of claim 17, wherein determining the classification is made in response to at least one of:
  radar return data obtained from radar azimuth or elevation sweeps, and
  radar return data stored in a planar or volumetric memory.

22. The method of claim 17, wherein the weather sensing model comprises:
  information for directing dedicated azimuth, elevation and/or diagonal antenna sweeps of the aircraft weather radar system to acquire more information about the weather.

* * * * *